United States Patent
Isogawa

(10) Patent No.: US 7,695,380 B2
(45) Date of Patent: Apr. 13, 2010

(54) GOLF BALL

(75) Inventor: Kazuhiko Isogawa, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/337,288

(22) Filed: Jan. 7, 2003

(65) Prior Publication Data

US 2003/0148828 A1 Aug. 7, 2003

(30) Foreign Application Priority Data

Jan. 25, 2002 (JP) ............................. 2002-016805

(51) Int. Cl.
*A63B 37/06* (2006.01)
(52) U.S. Cl. .................................................. 473/378
(58) Field of Classification Search .................. 473/351, 473/378
See application file for complete search history.

(56) References Cited

U.S. PATENT DOCUMENTS

| | | | |
|---|---|---|---|
| 3,962,397 A * | 6/1976 | Narui et al. ................. 264/144 |
| 5,672,200 A * | 9/1997 | Heinz et al. ................. 106/403 |
| 6,450,900 B2 * | 9/2002 | Kametani et al. ........... 473/377 |
| 6,540,624 B1 * | 4/2003 | Isogawa ...................... 473/371 |
| 2001/0003716 A1 | 6/2001 | Kametani et al. | |

FOREIGN PATENT DOCUMENTS

| | | | |
|---|---|---|---|
| JP | 4-7368 | * | 1/1992 |
| JP | 11-114093 A | | 4/1999 |
| JP | 11-319147 A | | 11/1999 |
| JP | 11-349764 | * | 12/1999 |

OTHER PUBLICATIONS

Coating, The Am. Heritage Dictionary of the English Language (4th ed. 2004).*
Film The Am. Heritage Dictionary of the English Language (4th ed. 2004).*

* cited by examiner

*Primary Examiner*—Raeann Trimiew
(74) *Attorney, Agent, or Firm*—Birch, Stewart, Kolasch & Birch, LLP

(57) ABSTRACT

The present invention provides a golf ball having markings that are superior in luster, durability and weather resistance. The present invention relates to a golf ball having a marking formed by applying an ink composition on the surface thereof, wherein the ink composition has metal powder coated with a resin on the surface thereof and a pigment as essential components.

4 Claims, 1 Drawing Sheet

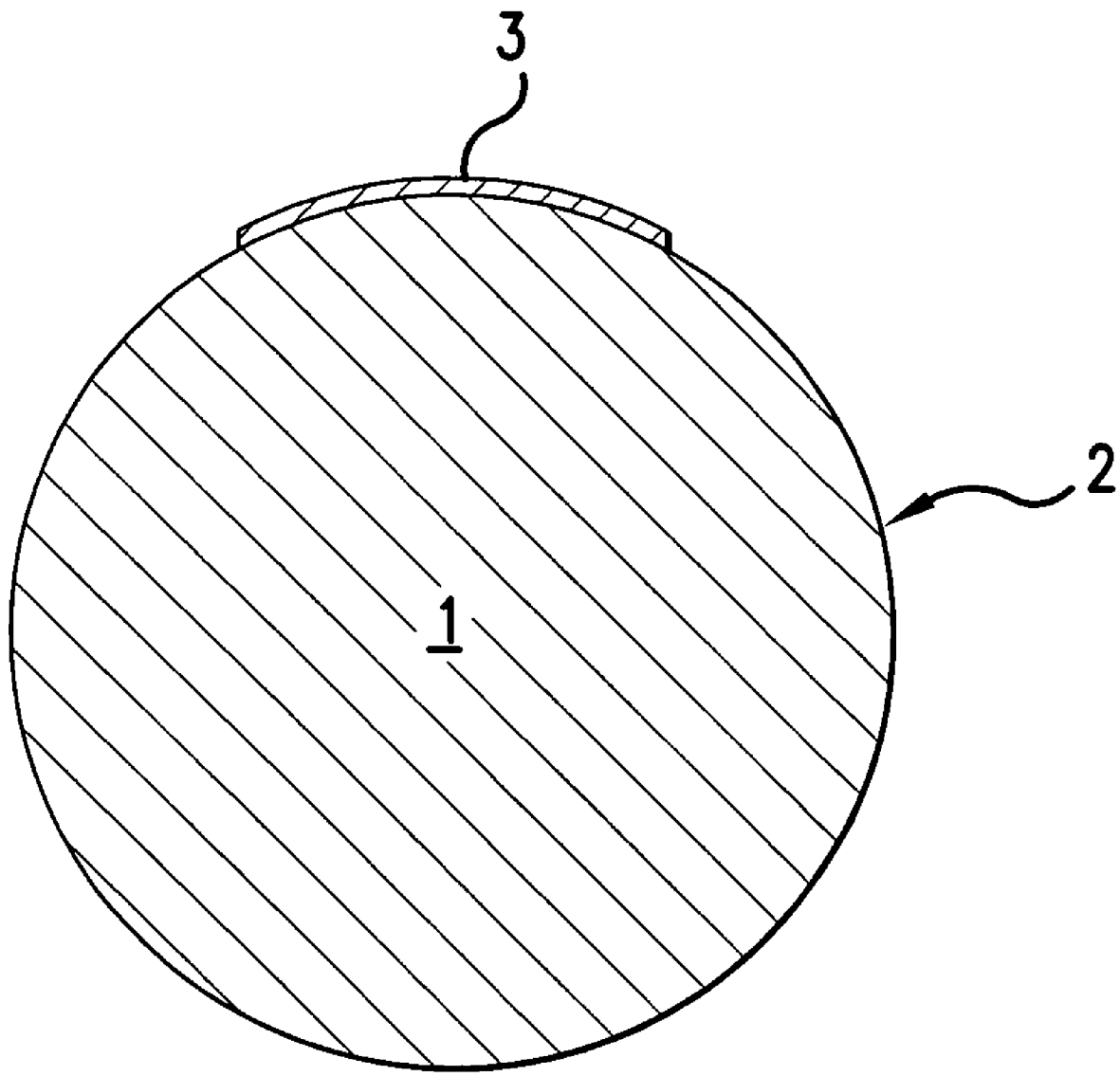
Figure

GOLF BALL

This nonprovisional application claims priority under 35 U.S.C. 119(a) on Patent Application No. 2002-016805 filed in JAPAN on January 25, 2002, which is herein incorproated by reference.

FIELD OF THE INVENTION

The present invention relates to a golf ball having markings thereon. More particularly, it relates to a golf ball having markings thereon that are superior in lustrousness, durability and weather resistance.

BACKGROUND OF THE INVENTION

Golf balls are generally finished to put markings thereon, such as letters indicating trade names or the like, numbers, designed drawings and the like. Golf balls having been further required to put markings imparting high quality appearance or distinguished appearance to the balls. In order to satisfy the requirements, it is proposed in Japanese Patent Kokai Publication Nos. 114093/1999, 319147/1999 and the like that metal powder is formulated into ink for markings to give metallic lustrous markings on the golf balls.

In Japanese Patent Kokai Publication No. 114093/1999, a golf ball having markings on the surface thereof is disclosed. The markings are formed from an ink composition containing pigment and metal powder.

In Japanese Patent Kokai Publication No. 319147/1999, a golf ball having a mark of a desired pattern on the surface thereof is disclosed. The mark is applied with an ink composition containing a component, which can afford to develop luster.

However, since materials such as metal powder generally are inferior in dispersibility in the ink composition, there are problems that it is difficult to prepare the ink composition, and transferability of the ink composition by using a silicone pad is poor when the markings are formed by pad printing. It is required for the marking of the golf ball to have a sufficient durability to endure impact force from repeated hitting. However, since the dispersibility of the metal powder and the like is poor, the marking is too brittle, and the durability of the marking is not sufficiently obtained.

OBJECTS OF THE INVENTION

A main object of the present invention is to provide a golf ball having markings thereon that are superior in lustrousness, durability and weather resistance.

According to the present invention, the object described above has been accomplished by using metal powder coated with a resin on the surface thereof and a pigment in the ink composition for marking, thereby providing a golf ball having markings thereon that are superior in lustrousness, durability and weather resistance.

SUMMARY OF THE INVENTION

The present invention relates to a golf ball having a marking formed by applying an ink composition on the surface thereof, wherein the ink composition comprises metal powder coated with a resin on the surface thereof and a pigment as essential components.

In order to put the present invention into a more suitable practical application, it is desired that an amount of the metal powder coated with a resin on the surface thereof be from 3 to 30 parts by weight, based on 100 parts by weight of the ink composition;

the metal powder be one or mixture of two or more selected from the group consisting of aluminum, copper, zinc and brass; and the resin, with which the surface of the metal powder is coated, be acrylic resin.

In the marking formed on the golf ball of the present invention, the dispersion of the metal powder in the ink composition is improved by coating metal powder with a resin. Therefore, it is easy to prepare the ink composition, the transferability of the ink composition is excellent, the durability of the marking is improved, and the weather resistance and chemical resistance (such as acid resistance, alkali resistance) are improved.

The term "pigment" as used herein refers to coloring material, which is generally called "pigment", used for coloring an object, and white or colored inorganic compound and organic compound, which is not dissolved in a medium such as water, oil and solvent, and includes clear organic pigment, but does not include pigments such as aluminum, copper, zinc and brass, which are used as a metal powder in the present invention.

DETAILED DESCRIPTION OF THE INVENTION

The golf ball of the present invention may be either solid golf balls, such as a one-piece golf ball, two-piece golf ball, and multi-piece golf ball represented by a three-piece golf ball, or thread wound golf balls.

As shown in the figure, a golf ball of the present invention comprises a ball body 1 and a mark 3 printed on the surface 2 of the ball body 1 using the ink composition of the present invention.

In case of the solid golf ball, one-piece golf ball or a core used for solid golf (solid core) may be the same one that has been conventionally used, and may be obtained by mixing a rubber composition using a mixer such as a mixing roll, and then vulcanizing and press-molding under applied heat the rubber composition in a mold into a spherical form. The rubber composition comprises 10 to 60 parts by weight of a vulcanizing agent (crosslinking agent), for example, α,β-unsaturated carboxylic acid (such as acrylic acid, methacrylic acid, etc.) or mono or divalent metal salts, such as zinc or magnesium salts thereof, or a functional monomer such as trimethylolpropane trimethacrylate, or a combination thereof;

0.5 to 5 parts by weight of co-crosslinking initiator such as organic peroxides;

10 to 30 parts by weight of filler such as zinc oxide, barium sulfate and the like; and optionally antioxidant, based on 100 parts by weight of a base rubber such as polybutadiene. The vulcanization may be conducted, for example, by press molding in a mold at 130 to 240° C. and 2.9 to 11.8 MPa for 15 to 60 minutes. It is preferable for the surface of the resulting core to be buffed to improve the adhesion to the cover layer formed on the core. The solid core may have single-layered structure or multi-layered structure which has two or more layers.

The core for thread wound golf ball (thread wound core), which may be also the same one that has been conventionally used, comprises a center and a thread rubber layer formed by winding thread rubber in a stretched state around the center, wherein the center may be either liquid center or solid center formed from rubber composition. The thread rubber can be of the same kind, which has been conventionally used for the thread rubber layer of the thread wound golf ball. For example, the thread rubber can be obtained by vulcanizing a rubber composition prepared by formulating sulfur, a vulcanization aid, a vulcanization accelerator, an antioxidant and the like to a natural rubber or a blend rubber of the natural rubber and a synthetic polyisoprene. A thread-wound core can be produced by drawing the thread rubber about 1000% and winding it over the center. However, such solid and thread-wound cores are given by way of illustrative examples only, and the invention shall not be limited thereto.

The cover is then covered on the core. In the golf ball of the present invention, the cover may be formed from thermoplastic resin such as ionomer resin and thermoplastic elastomer, balata or hard rubber and the like, which has been conventionally used for the cover of the golf ball.

In the golf ball of the present invention, the cover composition may optionally contain fillers (such as barium sulfate, etc.) pigments (such as titanium dioxide, etc.) and the other additives such as a dispersant, an antioxidant, a UV absorber, a photostabilizer and a fluorescent agent or a fluorescent brightener, etc., in addition to the above base resin as long as the addition of the additives does not deteriorate the desired performance of the golf ball cover.

A method of covering on the core with the cover is not specifically limited, but may be a conventional method. For example, there can be used a method comprising molding the cover composition into a semi-spherical half-shell in advance, covering the core with the two half-shells, followed by press molding, or a method comprising injection molding the cover composition directly on the core, which is covered with the cover, to cover it.

At the time of molding the cover, many depressions called "dimples" may be formed on the surface of the golf ball. Furthermore, markings are formed on the surface of the cover, and then clear paint is coated to finish the golf ball for commercial purposes. It is preferable for the surface of the cover to be buffed as a pretreatment to improve the adhesion to the mark or paint. In the present invention, it is required for the surface of the golf ball to have markings formed by applying an ink composition comprising metal powder coated with a resin on the surface thereof and a pigment as essential components. The ink composition comprises a base resin, additive, solvent and the like in addition to the metal powder and pigment.

Examples of the metal powder include one or mixture of two or more selected from the group consisting of aluminum, copper, zinc and brass. Preferred is aluminum in view of storage stability and weather resistance.

It is desired for the metal powder to have a particle diameter of 5 to 40 µm, preferably 5 to 35 µm, more preferably 5 to 30 µm. When the particle diameter of the metal powder is larger than 40 µm, the transferability at the time of pad printing is degraded. On the other hand, when the particle diameter of the metal powder is smaller than 5 µm, the lustrousness of the resulting mark is poor.

It is desired for the metal powder to have an average particle diameter of not more than 20 µm, preferably 5 to 20 µm, more preferably 5 to 15 µm. When the average particle diameter of the metal powder is larger than 25 µm, the durability of the resulting mark is degraded.

It is desired for the amount of the metal powder to be from 3 to 30 parts by weight, preferably 3 to 20 parts by weight, more preferably 5 to 15 parts by weight, based on 100 parts by weight of the ink composition. When the amount of the metal powder is larger than 30 parts by weight, the durability of the resulting marking is degraded. On the other hand, when the amount of the metal powder is smaller than 3 parts by weight, the lustrousness of the resulting marking is not sufficiently obtained.

It is desired for the metal powder to be coated with a resin on the surface thereof. Examples of the resin for coating include acrylic resin, epoxy resin, vinyl resin, urethane resin, polyester resin and the like. Preferred is acrylic resin in view of weather resistance and chemical resistance. A method of coating the metal powder is not limited as long as it is a method, which has been conventionally used for coating the surface of particle. In the present invention, the adhesion, weather resistance and chemical resistance of the marking are improved by coating the surface of the metal powder with a resin as described above.

The pigment is not limited as long as the desired color of the marking is obtained, but includes inorganic pigment, such as carbon black, titanium oxide and barium sulfate; organic pigment, such as phthalocyanine blue, benzimidazolone pigment orange, disazo pigment yellow and naphthol AS monoazo pigment red; and the like.

The amount of the pigment is from 0.5 to 20 parts by weight, preferably from 1 to 10 parts by weight. When the amount of the pigment is smaller than 0.5 parts by weight, the chromaticity of the resulting marking is not sufficiently obtained. On the other hand, when the amount of the pigment is larger than 20 parts by weight, the color obtained from the pigment is too strong, and the lustrousness of the metal powder is not sufficiently obtained.

The base resin may be one that has been conventionally used for a marking ink and is not limited, but includes polyester resin, epoxy resin, nitrocellulose, acrylic resin, vinyl chloride-vinyl acetate copolymer, urethane resin, polyamide resin and the like. Preferred are epoxy resin, polyester resin, nitrocellulose and the like in view of adhesion. For example, in case of using epoxy resin as a base resin, it is preferable to use hexamethylene diisocyanate, isophorone diisocyanate, tolylene diisocyanate and the like as a curing agent.

The amount of the base resin is from 15 to 50 parts by weight, preferably 20 to 45 parts by weight, more preferably 20 to 40 parts by weight, based on 100 parts by weight of the ink composition. When the amount of the base resin is smaller than 15 parts by weight, the adhesion of the marking to the golf ball body is degraded. On the other hand, when the amount of the base resin is larger than 50 parts by weight, the amount of the solvent and pigment is relatively small, and the chromaticity of the resulting marking is not sufficiently obtained.

The additive includes matting agent, anti-foaming agent and the like. Examples of the matting agents include colloidal silica, low-density polyethylene, medium-density polyethylene and the like. Examples of the anti-foaming agents include methyl siloxane and the like. As the additive, the amount of the matting agent is preferably from 0.5 to 5 parts by weight, and the amount of the anti-foaming agent is preferably from 0.5 to 5 parts by weight, based on 100 parts by weight of the ink composition.

The solvent is not limited as long as it is one that has been conventionally used for the marking ink, but includes cyclohexanone, acetyl acetone, propylene glycol monomethylether acetate, methoxy methylbutyl acetate, ethyl acetate, aromatic hydrocarbon and the mixed solvent of two or more thereof.

The amount of the solvent is from 20 to 60 parts by weight, preferably 25 to 55 parts by weight, more preferably 30 to 55 parts by weight, based on 100 parts by weight of the ink composition. When the amount of the solvent is smaller than 20 parts by weight, the viscosity of the ink composition is too high, and the printability is degraded. On the other hand, when the amount of the solvent is larger than 60 parts by weight, the drying time after forming the marking is too long, and the productivity is degraded.

The weight of golf balls is limited to not more than 45.92 g in accordance with the regulations for large size golf balls, but the lower limit is not established. The one-piece golf ball of the present invention has a weight of 44.0 to 45.8 g, preferably 44.2 to 45.8 g. When the weight is smaller than 44.0 g, inertia of the golf ball on the fly is lost, and the golf ball stalls at the latter half flight period, which reduces the flight distance. On the other hand, when the weight is larger than 45.8 g, the shot feel is heavy and poor.

The golf ball of the present invention can have a diameter of 41.0 to 44.0 mm, but the diameter is preferably at least 42.67 mm in accordance with the regulations for large size golf balls, and the diameter is typically about 42.75 mm.

EXAMPLES

The following Examples and Comparative Examples further illustrate the present invention in detail but are not to be construed to limit the scope of the present invention.

Production of Core

The rubber composition for the core having formulations shown in Table 1 was mixed, and press-molded at 160° C. for 13 minutes in a mold, which is composed of an upper mold and a lower mold having a semi-spherical cavity to obtain a spherical core having a diameter of 39.3 mm.

TABLE 1

| Core composition | | Amount (parts by weight) |
|---|---|---|
| Polybutadiene | *1 | 100 |
| Zinc oxide | | 5.6 |
| Zinc acrylate | | 22.0 |
| Calcium carbonate | | 21.0 |
| Dicumyl peroxide | | 1.85 |

*1: High-cis-polybutadiene, commercially available from JSR Co., Ltd. under the trade name of "BR-11"

Preparation of Cover Composition

The material having formulations shown in Table 2 was mixed using a kneading type twin-screw extruder to obtain pelletized cover composition. The extrusion condition was,
 a screw diameter of 45 mm,
 a screw speed of 200 rpm, and
 a screw L/D of 35.

The formulation material was heated at 200 to 260° C. at the die position of the extruder.

TABLE 2

| Cover composition | | Amount (parts by weight) |
|---|---|---|
| Hi-milan 1605 | *2 | 40 |
| Hi-milan 1706 | *3 | 30 |
| Hi-milan 1707 | *4 | 30 |
| Titanium oxide | | 2 |

*2: Hi-milan 1605 (trade name), ethylene-methacrylic acid copolymer ionomer resin obtained by neutralizing with sodium ion, manufactured by Du Pont-Mitsui Polychemicals Co., Ltd.
*3: Hi-milan 1706 (trade name), ethylene-methacrylic acid copolymer ionomer resin obtained by neutralizing with zinc ion, manufactured by Du Pont-Mitsui Polychemicals Co., Ltd.
*4: Hi-milan 1707 (trade name), ethylene-methacrylic acid copolymer ionomer resin obtained by neutralizing with sodium ion, manufactured by Du Pont-Mitsui Polychemicals Co., Ltd.

Examples 1 to 6 and Comparative Examples 1 to 3

The cover composition was covered on the resulting core by directly injection molding to form a cover layer and obtain a two-piece golf ball body having a diameter of 42.7 mm. The mold for molding the cover, which is composed of an upper mold and a lower mold, has a semi-spherical cavity, and the cavity has dimples, of which one part is movable and also functions as hold pin. The core was placed in the cavity of the mold, and was held by putting out the hold pin. Cover resin under applied heat to 210° C. was injected in the mold, which was closed at clamping pressure of 80 t, for 0.3 seconds, and was cooled for 30 seconds to open the mold, followed by taking out the golf ball. After sandblasting the surface of the golf ball, the marking was formed by pad printing the ink composition having formulations shown in Tables 3 and 4. Then, clear paint was coated on the surface to obtain a golf ball. With respect to the resulting golf ball, the durability and lustrousness of the marking were evaluated, and the results are shown in the same Tables. The test methods are as follows.

(Test Methods)

(1) Durability of Marking

After a No.1 wood club (W#1, a driver) was mounted to a swing robot manufactured by True Temper Co. and the golf ball was hit at a head speed of 45 m/sec 100 times, the appearance of the golf ball was checked by visual observation, and the durability of the marking was determined by evaluating the degree of separation of the marking. The evaluation criteria are as follows.

Evaluation criteria
 oo: There is no separation of the marking.
 o: The total length of separation of the marking is smaller than 1 mm.
 Δ: The total length of separation of the marking is not less than 1 mm to smaller than 2 mm.
 x: The total length of separation of the marking is not less than 2 mm.

(2) Lustrousness

The lustrousness was determined by checking the appearance of the golf ball after marking by visual observation. The evaluation criteria are as follows.

Evaluation criteria
 o: The marking has distinct lustrousness.
 Δ: The marking has slightly lustrousness.
 x: The marking has no lustrousness.

(3) Weather resistance

With respect to the resulting golf ball, accelerated weathering test was conducted, and the degree of discoloration was determined by measuring the color tone of the surface of the golf ball between before and after the test. In the accelerated weathering test, the resulting golf ball was expose to a sunshine carbon arc light for 60 hours according to JIS D 0205 by using a sunshine super long life weather meter (type WEL-SUN-HC/B) manufactured by Suga Test Instruments Co., Ltd. The test was conducted at 63° C., measured by a black panel thermometer, humidity of 50% and under rainfall for 12 minutes every 60 minutes. The Lab color difference ($\Delta L$, $\Delta a$ and $\Delta b$) at the same measuring point on surface of the golf ball between before and after the test was measured by using a color-difference-colorimeter, which is commercially available from Minolta Co., Ltd. under the TRADE NAME "CR-221", and was represented by $\Delta E$. The "L" value is a color value in Lab colorimetric system and represents "whiteness", and the "a" value and "b" value are chromaticity showing hue and chroma and represent "color shade". The $\Delta E$ is determined by using the following formula:

$$\Delta E = [(\Delta L)^2 + (\Delta a)^2 + (\Delta b)^2]^{1/2}$$

The larger the value of color difference $\Delta E$ is, the less the weather resistance is.

TABLE 3

| | | Example No. | | | |
|---|---|---|---|---|---|
| Marking ink composition | | 1 | 2 | 3 | 4 |
| Ink | | | | | |
| Epoxy resin | | 31 | 28 | 33 | 24 |
| Curing agent | *5 | 6 | 5 | 6 | 4 |
| Solvent | *6 | 50 | 48 | 54 | 41 |
| Additive | *7 | 1 | 1 | 1 | 1 |
| Metal powder | | | | | |
| Aluminum powder | *8 | — | — | — | — |
| Coated aluminum powder | *9 | 10 | 10 | 4 | 28 |

TABLE 3-continued

|  | Example No. | | | |
| Marking ink composition | 1 | 2 | 3 | 4 |
| --- | --- | --- | --- | --- |
| Pigment | | | | |
| Carbon black | 12 | — | 2 | 2 |
| Disazo pigment yellow | — | 8 | — | — |
| Durability of marking | ⊚ | ⊚ | ⊚ | ○ |
| Lustrousness | ○ | ○ | ○ | ○ |
| Weather resistance | | | | |
| Initial value       L | 37.77 | 44.53 | 35.88 | 39.36 |
| a | 0.24 | 3.50 | 0.19 | 0.21 |
| b | −0.64 | 27.61 | −0.60 | −0.70 |
| After treatment     L | 37.46 | 44.02 | 35.68 | 38.76 |
| a | 0.02 | 3.22 | 0.02 | −0.01 |
| b | −0.09 | 27.78 | −0.12 | −0.13 |
| ΔE | 0.67 | 0.61 | 0.56 | 0.86 |

TABLE 4

|  | Comparative Example No. | | |
| Marking ink composition | 1 | 2 | 3 |
| --- | --- | --- | --- |
| Ink | | | |
| Epoxy resin | 34 | 20 | 31 |
| Curing agent *5 | 6 | 4 | 6 |
| Solvent *6 | 55 | 38 | 50 |
| Additive *7 | 1 | 1 | 1 |
| Metal powder | | | |
| Aluminum powder *8 | — | — | 10 |
| Coated aluminum powder *9 | 2 | 35 | — |
| Pigment | | | |
| Carbon black | 2 | 2 | 2 |
| Disazo pigment yellow | — | — | — |
| Durability of marking | ⊚ | x | ○ |
| Lustrousness | x | ○ | ○ |
| Weather resistance | | | |
| Initial value       L | 35.31 | 39.61 | 37.62 |
| a | 0.18 | 0.22 | 0.28 |
| b | −0.60 | −0.75 | −0.66 |
| After treatment     L | 35.11 | 38.92 | 36.55 |
| a | −0.03 | −0.04 | 0.10 |
| b | −0.23 | −0.12 | 0.61 |
| ΔE | 0.47 | 0.97 | 1.67 |

*5: Hexamethylene diisocyanate
*6: Mixed solvent shown in Table 5
*7: Matting agent
*8: Paste of aluminum powder formed by dispersing the aluminum powder in hydrocarbon solvent; content of aluminum powder = 50%, average particle diameter = 10.5 μm, thickness = 18 Å
*9: Paste of aluminum powder coated with acrylic resin on the surface thereof, which is formed by dispersing the aluminum powder in hydrocarbon solvent; content of aluminum powder = 47%, average particle diameter = 11.6 μm, thickness = 20 Å

TABLE 5

| Solvent | Blend ratio (%) |
| --- | --- |
| Methoxy methylbutyl acetate | 50 |
| Acetyl acetone | 20 |
| Propylene glycol monomethylether acetate | 6 |
| Ethyl acetate | 4 |
| Aromatic mixed hydrocarbon | 20 |

As is apparent from the results of Tables 3 to 4, the golf balls of the present invention of Examples 1 to 4, when compared with those of Comparative Examples 1 to 3, have markings that are superior in lustrousness, durability and weather resistance.

On the other hand, in the golf ball of Comparative Example 1, since the amount of the metal powder coated with a resin on the surface thereof in the ink composition for marking is small, the lustrousness is not sufficiently obtained.

In the golf ball of Comparative Example 2, since the amount of the metal powder coated with a resin on the surface thereof in the ink composition for marking is large, the lustrousness is sufficiently obtained, but the durability of the marking is poor.

In the golf ball of Comparative Example 3, the metal powder is used for the marking, but the metal powder is not coated with a resin on the surface thereof, and the weather resistance is very poor.

What is claimed is:

1. A golf ball having a marking formed by pad printing an ink composition on the surface thereof, wherein the ink composition comprises metal powder coated with a resin on the surface thereof and a pigment as essential components, wherein an amount of the metal powder coated with a resin on the surface thereof is from 5 to 15 parts by weight, based on 100 parts by weight of the ink composition.

2. The golf ball according to claim 1, wherein the metal powder is one or mixture of two or more selected from the group consisting of aluminum, copper, zinc and brass.

3. The golf ball according to claim 2, wherein the resin, with which the surface of the metal powder is coated, is acrylic resin.

4. The golf ball according to claim 1, wherein the amount of said pigment is from 0.5 to 20 parts by weight based on 100 parts by weight of the ink composition.

* * * * *